March 10, 1942.  J. W. LEIGHTON  2,276,049
SHACKLE STRUCTURE
Filed Aug. 25, 1939
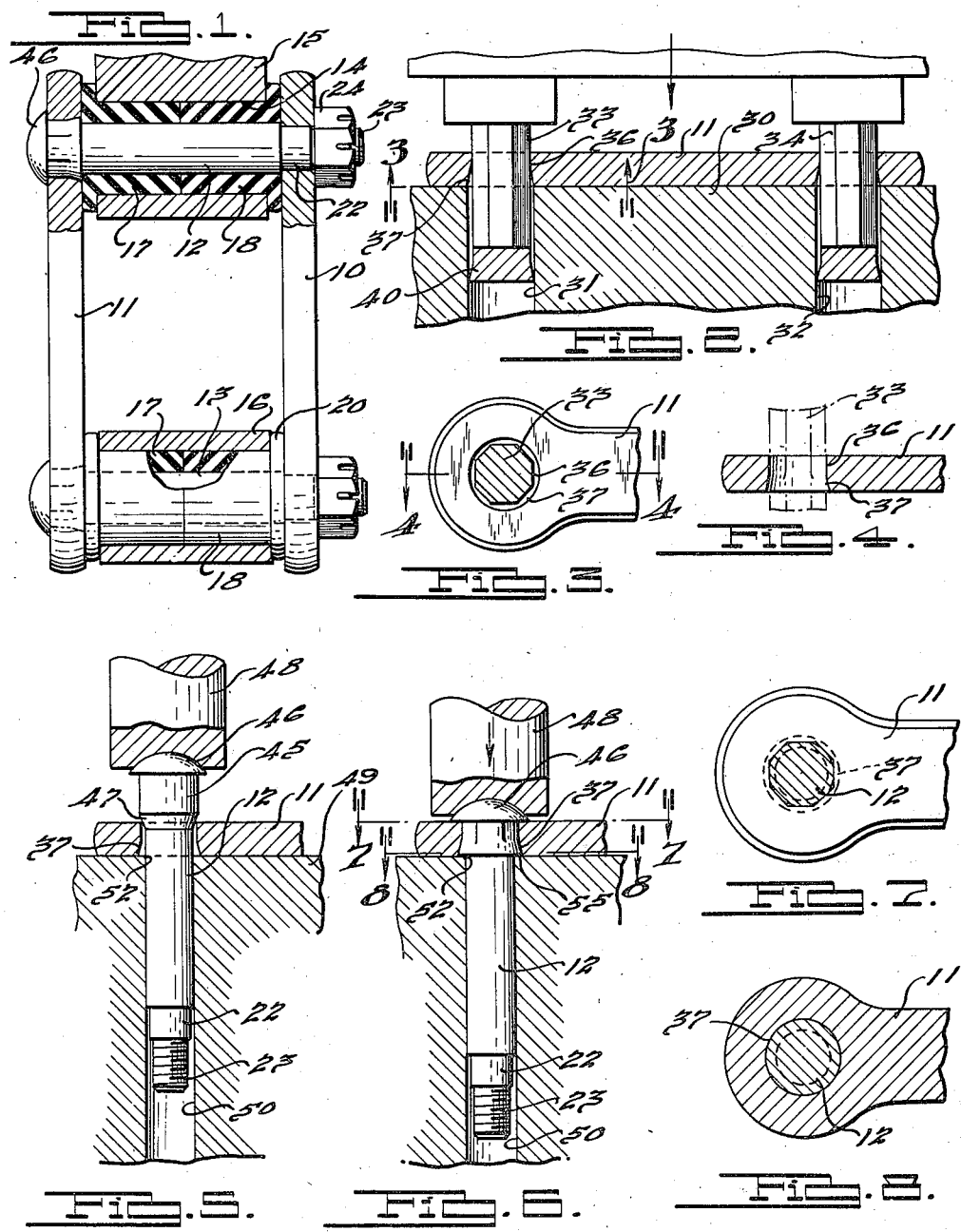
INVENTOR
John W. Leighton.
BY
Harness, Dickey & Pierce.
ATTORNEYS Patented Mar. 10, 1942

2,276,049

UNITED STATES PATENT OFFICE 2,276,049

SHACKLE STRUCTURE

John W. Leighton, Port Huron, Mich.

Application August 25, 1939, Serial No. 291,959

3 Claims. (Cl. 287—20)

The invention relates generally to automobiles and it has particular relation to improvements in spring shackles.

One object of the invention is to provide an improved spring shackles including a side bar and a trunnion projecting therefrom, wherein the trunnion and side bar are connected in a simpler and less expensive manner so as to reduce the cost of manufacture.

Another object of the invention is to provide a shackle of this general type which is strong and durable and wherein the parts are positively connected against loosening.

Another object of the invention is to provide a method of connecting a side bar to a trunnion such as mentioned which enables obtaining a strong and positive connection that is less expensive in so far as manufacturing is concerned.

And in general it is an object of the invention to provide an improved connection between a bar and a pin or trunnion projecting therefrom which is simple, durable, and inexpensive to construct.

Other objects of the invention will become apparent from the following specification, from the claims hereinafter set forth, and from the drawing to which the specification relates.

For a better understanding of the invention, reference may be had to the drawing, wherein:

Figure 1 is an elevational view, partly in cross-section, showing a spring shackle constructed according to one form of the invention;

Fig. 2 is a cross-sectional view showing a die and punches for forming openings in the side bar of the shackle;

Fig. 3 is a cross-sectional view taken substantially along the line 3—3 of Fig. 2;

Fig. 4 is a cross-sectional view taken substantially along the line 4—4 of Fig. 3;

Fig. 5 shows a relation of assembly dies, trunnions, bar and punch for assembling and connecting the trunnions and bar;

Fig. 6 is a view on the order of Fig. 5, but showing the parts finally connected;

Fig. 7 is a cross-sectional view taken substantially along the line 7—7 of Fig. 6;

Fig. 8 is a cross-sectional view taken substantially along the line 8—8 of Fig. 6.

Referring to Fig. 1, the shackle illustrated comprises side bars 10 and 11 interconnected by trunnions or pins 12 and 13 located respectively at opposite ends of the bars. The pin 12 is shown as projecting through an opening 14 in a vehicle frame member 15 while the pin 13 is shown as projecting through an eye 16 of a leaf spring. Rubber bushings 17 and 18 are disposed around each of the pins and within the openings in the frame and spring and such bushings have outwardly directed flange portions 20 which project outwardly along side bars. Each of the pins is secured positively and rigidly to the bar 11 and has a reduced cylindrical portion 22 located in an opening in an end of the other side bar 10. The outer end of the pin is threaded as indicated at 23 and a nut 24 on the threaded end tightly locks the pin to the side bar 10, with the shoulder at the inner end of the portion 22 abutting the inner side of the bar. This shoulder definitely limits axial compression of the rubber bushings and it will be understood that the flanges 20 may be initially formed on the bushings, or they may be formed by axial compression of such bushings when the nuts 24 are tightened. Axial compression of the bushings frictionally binds them in the openings and to the surface of the pins, and thus during any oscillatory movement of the shackle, the movement is resisted through circumferential twisting of the rubber. If desired, the rubber may be bonded to the pins and also bonded to the vehicle frame member and spring leaf to be desirable.

Attention now will be directed to the connection between the pins and the side bar 11 since the invention deals particularly with this connection and the method of obtaining it.

Referring to Figs. 2, 3 and 4, the side bar 11 is placed on a die 30 having round openings 31 and 32 and is disposed under punch elements 33 and 34. The punch elements are of octagonal cross section and the openings 31 and 32 are slightly larger in diameter than that of the punch elements and this relation of size of die opening and punch element is shown particularly by Fig. 3. Now when the punch elements are moved downwardly, the punches form openings in the side bar 11 that are generally octagonal in substantially the upper half of the opening as indicated at 36, while substantially the lower half of the opening as indicated by the numeral 37 is generally conical, tapering from the end of the octagonal part of the opening to a larger end which corresponds in size to that of the openings 31 and 32 in the die 30. Formation of the tapered part 37 of the opening occurs automatically owing to the relative sizes of the punch and die openings and slugs removed from the bar during the formation of the openings are indicated by the numerals 40.

Each of the pins 12 and 13, in addition to the structure specified previously, has an enlarged end portion 45 adjacent a head 46, and between the main body of the pin and the enlarged portion 45, a tapered shoulder 47 is provided. In assembling each pin with the side bar 11, an upper punch 48 is employed in conjunction with a lower die member 49 and this lower die member has an opening 50 slightly larger than the main body of the pin so that it may freely slide thereon. It may be noted also that the enlarged portion 45 of the pin is slightly larger than the octagonal opening so that pressure is required to force it therethrough. Now when the punch 48 is moved downwardly, the pin is moved downwardly through the opening in the bar and the enlarged portion 45 of the pin is forced through the octagonal portion of the opening in the side member and an interlocking engagement occurs between the opening and the enlarged portion by deformation of metallic portions so that the pin is positively locked against rotary movement in the opening. As the pin continues to move through the die opening 50, the tapered portion 47 engages a corner 52 of the die and continued movement of the pin causes metal to be forced outwardly into the tapered portion of the opening in the side member to substantially fill such opening as indicated at 55. Due to the fact that the corner 52 which engages the taper 47 on the pin is closely adjacent the surface of the main body of the pin, metal is forced toward the head 46 as the punch 48 moves and the space is so slight between the main body of the pin and the opening 50, that metal is prevented from extruding towards the threaded end of the pin. Moreover, resistance to upsetting of the metal into the tapered portion of the opening increases but gradually and if and when such resistance should become sufficient to cause extension of metal towards the threaded end under other circumstances, the corner 52 has moved so far over the shoulder with accompanying close fit of shoulder and opening, that the extension mentioned cannot occur.

With the metal upset into the tapered portion of the opening, the pin is locked positively against axial movement in the opening and the octagonal engagement between the pin and the side bar, as well as the pressure fit of the pin in the opening, locks the pin against turning.

It is a simple manufacturing operation to form the openings in the side member and to assemble the pins and the side members since only pressure operations are required, using a punch and a lower die member. Manufacture of the pins may be effected by means of automatic machinery, as will be understood. Bar members 10 and 11 can be formed from wire of predetermined size which is upset at each end to form ball formations and then the wire may be flattened to provide a flat side bar with enlarged circular end portions in which the openings are to be formed. The manufacture of the side bars, pins, and nuts for the pins thus may be effected very inexpensively, and this, plus the simplicity of assembly, renders the structure less expensive than known other ways of connecting pins to side bars.

Although only one form of the invention has been illustrated and described in detail, it will be apparent to those skilled in the art that various modifications may be made without departing from the scope of the appended claims.

What is claimed is:

1. A connection comprising a bar having an opening therethrough which is formed from two portions extending inwardly respectively from opposite sides of the bar, one of such portions being polygonal in cross section and the other portion being generally frusto-conical with the smaller end of the latter portion merging directly into the inner end of the polygonal portion, and a trunnion projecting through said opening and having a head abutting the side of the bar around the outer end of the polygonal portion of the opening, a generally cylindrical portion next to such head and engaged sufficiently tightly with the polygonal portion of the opening as to lock the trunnion and bar against relative turning, and a portion comprising upset metal projecting substantially outwardly into the frusto-conical part of the opening so as to lock the trunnion against axial movement in the opening.

2. A connection comprising a bar having an opening therethrough which is formed from two portions extending inwardly respectively from opposite sides of the bar, one of such portions being polygonal in cross section and the other portion being generally larger than the polygonal portion and directly joining the inner end of the latter, and a trunnion projecting through said opening and having a head abutting the side of the bar around the outer end of the polygonal portion, a generally cylindrical portion next to said head and engaged sufficiently tightly with the polygonal portion of the opening as to lock the trunnion and bar against relative turning, and a portion comprising upset metal projecting substantially outwardly into the larger part of the opening so as to lock the trunnion against axial movement in the opening.

3. A connection comprising a bar having an opening therethrough which is formed from two portions extending inwardly respectively from opposite sides of the bar, one of such portions being generally smaller than the other and substantially uniform in cross-section from the side of the bar to its junction with the other portion of the opening, the other of such portions being generally frusto-conical with the smaller end thereof merging directly into the inner end of the smaller portion, and a trunnion projecting through said opening and having a head abutting the side of the bar around the outer end of said one of such portions of the opening, a generally cylindrical portion next to such head and engaged tightly with the smaller portion of the opening so as to lock the trunnion and bar against relative turning, and a portion comprising upset metal projecting substantially outwardly into the frusto-conical part of the opening so as to lock the trunnion against axial movement in the opening.

JOHN W. LEIGHTON.